F. A. GUILFORD.
SHOOTING GLASSES FOR MARKSMEN.
APPLICATION FILED MAY 11, 1908.
935,756.
Patented Oct. 5, 1909.
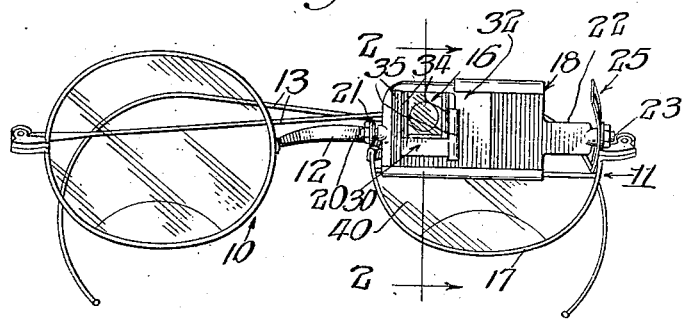
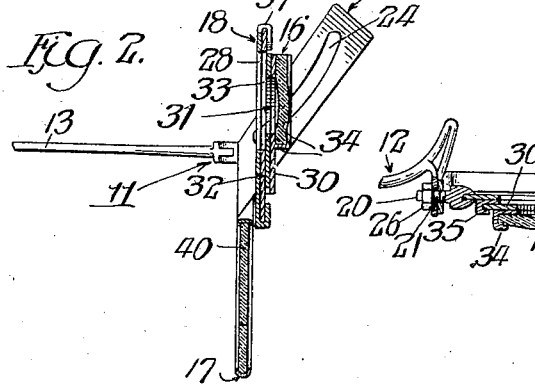
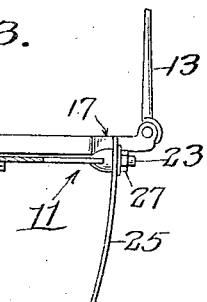
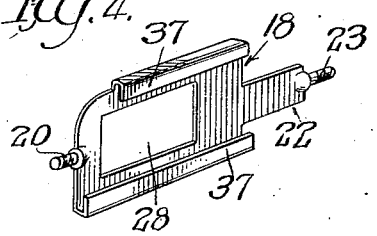
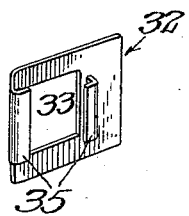
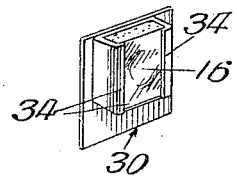
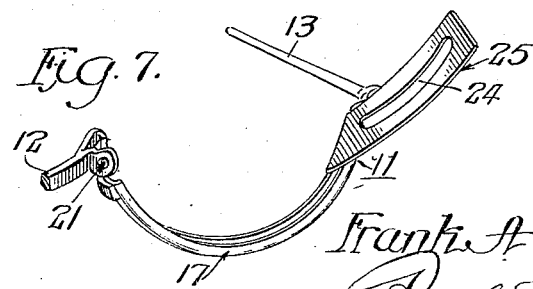
Witnesses:
Inventor
Frank A. Guilford
by Poole & Brown
Attys

UNITED STATES PATENT OFFICE.

FRANK A. GUILFORD, OF CHICAGO, ILLINOIS.

SHOOTING-GLASSES FOR MARKSMEN.

935,756.   Specification of Letters Patent.   Patented Oct. 5, 1909.

Application filed May 11, 1908. Serial No. 432,038.

*To all whom it may concern:*

Be it known that I, FRANK A. GUILFORD, a citizen of the United States, and a resident of Chicago, in the county of Cook and State of Illinois, have invented certain new and useful Improvements in Shooting - Glasses for Marksmen; and I do hereby declare that the following is a full, clear, and exact description thereof, reference being had to the accompanying drawings, and to the figures of reference marked thereon, which form a part of this specification.

This invention relates to improvements in eye-glasses or spectacles designed for use by marksmen, when target shooting, who are obliged to wear lenses to correct defects in vision.

The object of the invention is to provide an eye-glass or spectacle for the above or like uses which is provided with a small sighting lens so located that when the marksman takes the usual position for aiming or sighting a gun toward a target or like object, the line of vision of the sighting or shooting eye will pass at the proper angle through the sighting lens and through the proper area of the lens, notwithstanding the abnormal position of the eye with respect to a lens ground to correct defects of vision in the normal or usual use of the eye.

Practical experience has demonstrated that a lens ground to correct a defective vision, when worn in the usual position of a lens of an eye-glass or spectacle, cannot be comfortably used in target or like practice to obtain satisfactory results, for the reason that when the head of the marksman is inclined in the proper position to sight along the barrel of the gun, the eye-ball of the sighting eye is turned with its pupil inwardly toward the bridge of the nose so that the marksman is looking through the rim portion of the lens instead of through the center thereof through which it was intended that the line of vision should pass. The effect on the sighting eye is the same as though the marksman were looking through a lens not fitted to, or ground to correct the defects of, his vision so that the vision is not only imperfect, but the eye soon becomes tired and the vision obscured.

It is the purpose of the present invention to provide an eye-glass or a pair of spectacles, one side of which, depending upon which eye the marksman uses to sight or aim the gun, carries a small sighting lens which is located above and inside the center of a normal lens and near the bridge of the eye-glass or spectacles, so that when the sighting eye assumes its natural sighting position, the lens will be located directly in front of the eye and between the same and the target. The said small lens is ground to correct the vision in the same proportions as a normal lens, so that the vision of the marksman receives the same correction when sighting a gun as when normally using a lens of usual size. The other side of the frame may be equipped with a lens of usual size, ground to properly correct the defects of the vision of the other eye. Moreover, the side of the frame which carries the sighting lens may be provided below the support for the sighting lens with a lens designed for ordinary or normal uses of distant observation or close reading. It is desirable that the sighting lens be arranged for accurate adjustment to the sighting eye, and to this end the lens is movably mounted for both horizontal and vertical adjustment, as well as for angular adjustment with respect to a plane perpendicular to the normal line of vision.

I have shown one practical adaptation of my invention to a pair of ordinary spectacles, or a device generally resembling a pair of spectacles, but it will be understood that the essential features of my invention may be adapted in a variety of ways and I do not limit myself to the details of construction except as hereinafter made the subject of specific claims.

As shown in the drawings:—Figure 1 is a front elevation of a pair of shooting glasses embodying my invention. Fig. 2 is a vertical section thereof, taken on line 2—2 of Fig. 1. Fig. 3 is a partial top plan view and partial horizontal section of the side of the frame which carries the sighting lens. Figs. 4, 5 and 6 are perspective views of members of the sighting lens supporting and adjusting frame. Fig. 7 is a perspective view of a portion of the side of the frame which carries the sighting lens.

One side of the frame is provided with an ordinary form of lens holder 10, and the other side thereof has the form of a specially arranged holder 11 which carries the sighting lens and also carries, as herein shown, an observation and a reading lens. Said holders are connected by the usual bridge piece 12 and the frame is provided with the usual bows 13. My improvements may, however, be applied to an eye-glass frame.

16 designates the sighting lens referred to which is carried by the holder 11 at the inner side, and above the center, of said holder, it being located adjacent to the bridge 12. The holder 11 which carries said sighting lens embraces a downwardly curved or bowed member 17 and a horizontal lens carrying member 18, which latter extends between and is attached at its ends to the ends of said curved member. Said curved member is connected at its inner end with the bridge 12, and one of the bows 13 is hinged to its outer end. The lens carrying member 18 is made of sheet metal, and is provided at its inner end with a screw-threaded lug 20 which extends through an aperture 21 of the holder member 17 adjacent to the bridge 12, and is provided at its other or outer end with a shank 22 which terminates in a lug 23 that extends through a slot 24 of a forwardly and upwardly curved extension 25 of the holder member 17. The inner end of the lens carrying member 18 is fastened in place by means of a nut 26 which engages the screw-threaded stud 20. The lug 23 at the outer end of said lens carrying member is also screw-threaded and is fastened to the curved, slotted extension 25 of the holder member 11 by a nut 27. The horizontal lens carrying member 18 is provided with an opening 28 in front of which the sighting lens is mounted.

In order that the sighting lens may be accurately adjusted to the line of vision when the shooting eye is in position for sighting along the barrel of the gun, the said lens is mounted on the lens carrying member 18 in a manner to be adjusted both horizontally and vertically, as well as angularly to the line of vision. Such adjustment is effected in the present instance by the following construction: The sighting lens 16 is carried by an apertured plate 30 having an opening 31, and which is in turn carried by an intermediate adjusting plate 32 provided with an opening 33 and mounted on the horizontal lens carrying member 18 of the holder in front of the opening 28. The said lens carrying plate 30 is provided at the sides of the opening 31 therein with flanges 34 which are folded over the margins of the lens to hold the same in place thereon. The side or vertical margins of the lens carrying plate engage vertical flanges 35, 35 formed on the front face of the intermedate adjusting plate 32 at the sides of the opening 33 therein. The said holding flanges 35 frictionally engage the margins of the plate 30 to hold the same in place, while permitting said plate and the lens carried thereby to be adjusted vertically with respect to the opening 33 in said adjusting plate. The upper and lower margins of said adjusting plate 32 are in a like manner engaged with flanges 37, 37 formed on the upper and lower margins of the lens carrying member 18, whereby said adjusting plate and the lens carrying plate carried thereby may be adjusted laterally thereon. The adjustment of the lens carrying frame 18 to vary the angle of said frame and lens carried thereby relatively to a plane perpendicular to the normal line of vision is effected by pivoting the inner end of said frame in a manner to permit the frame to angularly turn about the axis of the stud 20 and to permit the outer end of the frame to swing toward and away from the face of the wearer through the range permitted by the slotted extension 25 which is engaged by the lug 23 at the outer end of said lens carrying frame. This adjustment is effected in the present instance by providing a slight looseness of fit at the connection of the lug 20 with the holder member to afford a swiveling connection of the lens carrying frame with the holder member which not only permits the lens carrying frame to swing toward and away from the face, but also permits the same to rise and fall as it is swung inwardly and outwardly and to be angularly adjusted relatively to the axis of the pivot stud 20. The said lens carrying frame is locked in adjusted positions by means of the nut 27. It will thus be seen that there is provided for the sighting lens a universal adjustment with respect to the holder, whereby said sighting lens may be quickly and accurately adjusted to the line of vision for all positions of shooting, notwithstanding the divergence of the line of vision of the sighting eye in any given position of shooting relatively to the normal line of vision.

The special holder for carrying the sighting lens arranged in the manner described, or in any other preferred manner for securing the same or like results may be applied to either side of the spectacle or eye-glass frame, depending upon whether or not the wearer of the shooting glass sights with his right or left eye. The said specially constructed holder carrying the sighting lens may desirably be arranged to carry a lens 40 beneath the sighting lens, designed to correct a defective vision for ordinary purposes of observation and reading. If the vision of the non-sighting eye be properly corrected by the lens at the other side of the frame, the use of the part-lens in the special holder may not be so important. In some cases, however, the vision of the non-sighting eye may be so impaired as to be of but little use for general observation of the target, and in this event it becomes important that the lens 40 be provided beneath the sighting lens, through which general observations of the target may be taken. Said latter lens, as well as the lens on the other side of the frame, may be a plain lens or a bi-focal lens, which latter is herein shown.

I claim as my invention:—

1. A spectacle or eye glass for marksmen provided near the nose piece of the main frame with a small sighting lens, and means for adjusting said lens universally with respect to said frame.

2. A spectacle or eye-glass frame having a small sighting lens supported on one side thereof, and means for separately adjusting said lens on the frame both vertically and horizontally.

3. A spectacle or eye-glass frame having a sighting lens carried by one side thereof, a support for said sighting lens mounted to swing toward and from the face of the wearer, and means for locking said support to the frame.

4. A spectacle or eye-glass frame having a sighting lens carried by one side thereof, a support for said sighting lens mounted to swing toward and from the face of the wearer, and means for adjusting said sighting lens both vertically and horizontally.

5. A spectacle or eye-glass frame provided at one side thereof with a horizontal, apertured lens carrying member, a small sighting lens mounted on said lens carrying member in front of the aperture thereof, and means for adjusting said sighting lens both vertically and horizontally.

6. A spectacle or eye-glass frame provided at one side thereof with a horizontal, apertured lens carrying member, a small sighting lens mounted thereon in front of the aperture, said lens carrying member being pivoted at one side to the frame in a manner to swing at its other end toward and from the face of the wearer, and means for locking the free end of said lens carrying member to the frame.

7. A spectacle or eye-glass frame provided at one side with a horizontal apertured lens carrying member, a small sighting lens, an apertured plate to which said lens is fixed, an apertured adjusting plate mounted on said lens carrying member in front of the opening thereof and arranged for horizontal adjustment thereon, said lens plate being mounted on said adjusting plate in front of the opening thereof in a manner to be vertically adjusted thereon.

8. A spectacle or eye-glass frame, one side member of which comprises a horizontal lens carrying member and a downwardly curved member upon the inner and outer ends of which said horizontal lens carrying member is supported, a sighting lens carried by said horizontal lens carrying member and adjustable thereon, and a lens mounted on the downwardly curved member below said horizontal sighting lens carrying member.

9. A spectacle or eye-glass frame, one side of which comprises a downwardly curved frame member, and a horizontal lens carrying member pivoted at its inner end to the inner end of said downwardly curved member, said downwardly curved member being provided at its outer end with an upwardly and forwardly curved, slotted extension and said horizontal lens carrying member being provided with a lug engaging said slotted extension, whereby said lens carrying member may be adjusted toward and from the face of the wearer, and a sighting lens carried by said lens carrying member.

10. A spectacle or eye-glass frame provided with a small sighting lens, a support for said lens hinged at one end to said frame to swing at its other end toward and from the frame, means for locking the swinging end of the support in adjusted positions, and means whereby said support is angularly adjustable to vary the angle of the lens to a plane perpendicular to the line of vision.

11. Spectacles or eye-glasses for marksmen provided with a small sighting lens, a swinging support for the lens and means affording both vertical and horizontal adjustment of the lens on said support.

In testimony, that I claim the foregoing as my invention I affix my signature in the presence of two witnesses, this 6th day of May A. D. 1908.

FRANK A. GUILFORD.

Witnesses:
W. L. HALL,
T. H. ALFREDS.